US008625563B1

(12) United States Patent
Fleming

(10) Patent No.: US 8,625,563 B1
(45) Date of Patent: *Jan. 7, 2014

(54) CONDUIT-SHARING APPARATUS, SYSTEMS, AND METHODS

(71) Applicant: Marvell International Ltd., Hamilton (BM)

(72) Inventor: Kristoffer D. Fleming, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,607

(22) Filed: Nov. 27, 2012

Related U.S. Application Data

(63) Continuation of application No. 12/637,303, filed on Dec. 14, 2009, now Pat. No. 8,320,348, which is a continuation of application No. 10/742,012, filed on Dec. 17, 2003, now Pat. No. 7,633,912.

(51) Int. Cl.
*H04W 4/00* (2009.01)

(52) U.S. Cl.
USPC ............................................. 370/338; 370/444

(58) Field of Classification Search
USPC ........................ 370/310, 312–314, 328–339
See application file for complete search history.

(56) References Cited

U.S. PATENT DOCUMENTS

| | | |
|---|---|---|
| 6,125,110 A | 9/2000 | Proctor et al. |
| 6,560,443 B1 | 5/2003 | Vaisanen et al. |
| 6,640,239 B1 | 10/2003 | Gidwani |
| 6,659,947 B1 | 12/2003 | Carter et al. |
| 7,146,133 B2 | 12/2006 | Bahl et al. |
| 2001/0010689 A1 | 8/2001 | Awater et al. |
| 2002/0028655 A1 | 3/2002 | Rosener et al. |
| 2002/0136233 A1 | 9/2002 | Chen et al. |
| 2002/0141376 A1 | 10/2002 | Kandala |
| 2003/0050015 A1 | 3/2003 | Kelly et al. |
| 2003/0108062 A1 | 6/2003 | Agrawal et al. |
| 2004/0192222 A1 | 9/2004 | Vaisanen et al. |

*Primary Examiner* — Frank Duong

(57) ABSTRACT

An apparatus and a system, as well as a method and article, may operate to share an energy conduit, such as an antenna, between first data communicated according to a first formatting mechanism and second data communicated according to a second formatting mechanism according to a first priority assigned to the first data and a second priority assigned to the second data. The first formatting mechanism may be different from the second formatting mechanism.

19 Claims, 4 Drawing Sheets

CONDUIT-SHARING APPARATUS, SYSTEMS, AND METHODS

INCORPORATION BY REFERENCE

This application is a continuation of U.S. patent application Ser. No. 12/637,303, filed Dec. 14, 2009, which is a continuation of U.S. patent application Ser. No. 10/742,012, filed Dec. 17, 2003, now U.S. Pat. No. 7,633,912. The disclosures of the prior applications are incorporated herein by reference in their entireties.

TECHNICAL FIELD

Various embodiments described herein relate to communications generally, such as apparatus, systems, and methods used to transmit and receive information, including data packets.

BACKGROUND INFORMATION

Various protocols, media definitions, and other formatting mechanisms may operate to determine how data may be communicated. Examples of these mechanisms include spread-spectrum techniques, the Institute of Electrical and Electronics Engineers (IEEE) 802.11 standards, and the Bluetooth Specification. Some communications devices, including wireless computing platforms, may use such mechanisms to communicate with other entities, using a single antenna or other wireless energy conduit.

Assuming an increasing consumer demand for multimedia communications, the need may arise to share a single energy conduit between two or more data streams, formatted according to a number of mechanisms (e.g., IEEE 802.11 and Bluetooth) as the data is communicated from one device to another. For more information regarding some of the formatting mechanisms mentioned above, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and "Bluetooth System Specification, Bluetooth Special Interest Group, Ver. 1.1, March 2001", and related amendments.

DETAILED DESCRIPTION

Figure 1:
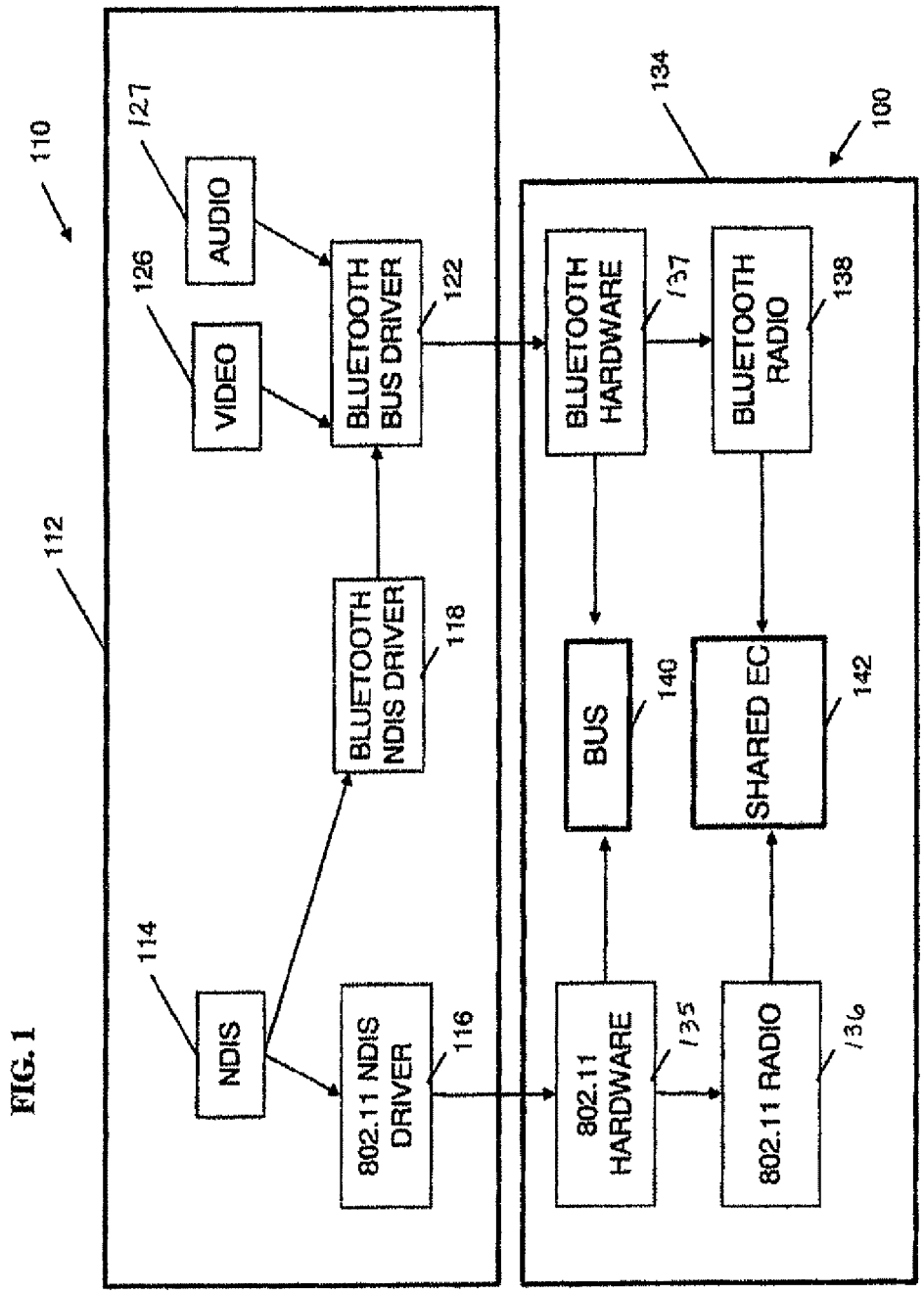
FIG. 1 is a conceptual diagram of an apparatus and a system according to various embodiments.

During the process of communicating information, wireless devices may operate to optimize communications by sharing a single energy conduit, such as an antenna. For example, to support the communication of real time data in some embodiments of the invention, a single antenna may be shared via time division multiplexing between various formatting mechanisms, such as Bluetooth and IEEE 802.11. To determine how the antenna may be shared, priority information may be attached to data packets and used to evaluate the order of the data to be sent or received.

For example, an IEEE 802.1Q priority tag may be used to identify the suggested priority of data contained in various packets, as assigned by an Operating System (OS) or networking application. The priority information can be used by routers and/or bridges in a network to order packets in their data queues. In some embodiments, packets with high-ranking IEEE 802.1Q priority tags can be placed at the beginning of transmission queues, perhaps operating to reduce the latency of intermediate nodes in the path of individual packets as they travel to their ultimate destination.

For the purposes of this document, the term "energy conduit" includes any type of device or apparatus that has the capability to transmit and/or receive energy to and/or from space. Examples of such energy conduits include antennas, infra-red transmitters, infra-red receivers, photo-emitters (e.g., light emitting diodes), photo-receptors (e.g., a photocell), and charge-coupled devices, among others.

A "formatting mechanism" includes any rule or guide for formatting data as it is communicated, with respect to time, space, frequency, and/or some other organizing function. Examples of such formatting mechanisms include communications standards (e.g., IEEE 802.11, Bluetooth), communications protocols (e.g., transmission control protocol/Internet protocol), spread-spectrum communications techniques, multiple carrier communications techniques (e.g., orthogonal frequency division multiplexing), a data format (e.g., time division, multiple access), and various data types (e.g., binary, alphanumeric, audio, video).

A "priority" may mean any indication or information which permits determining the order of transmission and/or reception of data associated with one formatting mechanism over data associated with another formatting mechanism, so as to permit ranking, for example, a unit of data (e.g., a first packet) associated with a first priority against another unit of data (e.g., a second packet) associated with a second priority. Examples of a priority include a priority tag attached to data according to the IEEE 802.1Q standard.

The term "transceiver" (e.g., a device including a transmitter and a receiver) may be used in place of either "transmitter" or "receiver" throughout this document. For more specific information regarding the 802.1 Q standard, please refer to "IEEE Standards for Local and Metropolitan Area Networks—Virtual Bridged Local Area Networks—IEEE Std. 802.1Q, 2003 Edition, and later versions.

FIG. 1 is a conceptual diagram of an apparatus 100 and a system 110 according to various embodiments. In this figure, a specific implementation of some embodiments is shown for simplicity, and it should not be used to limit the embodiments disclosed. Here it may be assumed that two formatting mechanisms are involved: IEEE 802.11 and Bluetooth. Of course, other formatting mechanisms can be used, and other numbers of formatting mechanisms can be used. In any case, the system 110 may include a software environment 112 having a module 114 operating according to the Microsoft® Network Driver Interface Specification (NDIS) to assign 802.1Q priority tags to data packets. For more information regarding the Microsoft® NDIS, please refer to the Microsoft Developer Network web site at http://msdn-microsoft-com/default-aspx (to avoid inadvertent hyperlinks the periods in the preceding URL have been replaced by dashes).

The packets may be sent to NDIS drivers, for example, an 802.11 NDIS driver 116 and a Bluetooth NDIS driver 118. The Bluetooth NDIS driver 118, in turn, may send such packets on to a Bluetooth bus driver 122, which may also receive packets having 802.1Q priority tags attached by other entities 126 and 127. In some embodiments, priorities are assigned in a software environment 112.

Thus, each packet waiting to be sent may receive an IEEE 802.1Q priority tag, to be compared with other priority tags. Many methods are available to assign priorities, including hardware and software elements, such as networking applications. Priority tag information, such as data priority level and management priority level, may be shared and/or compared between formatting mechanisms using a hardware bus and/or software, such as registers and/or a memory.

The system 110 may include one or more of the apparatus 100, which may in turn include a hardware environment 134 to receive packets from the software environment 112. An entity representing each formatting mechanism (e.g., one or more hardware and/or software modules 135-138 located in hardware specific to particular formatting mechanisms) may compare priorities, perhaps using a bus 140. The data associated with the greatest determined priority may be granted first access to the energy conduit 142, such as an antenna.

In the event that competing priorities are found to be substantially equal, then an arbitrator scheme, including a distributed arbitrator scheme, may be used to determine whether data associated with one formatting mechanism or the other will be communicated using the antenna. Such a scheme can vary in complexity from round-robin selection, to credit-based selection, to sliding window protocols, for example, as such arbitration schemes are known to those of skill in the art.

Access to the energy conduit (e.g., an antenna) by data associated with each formatting mechanism may be limited in time, and signals may be used to indicate when use of the antenna is complete, perhaps restarting the process to gain control of the antenna. When access to the antenna has been granted to data associated with a particular formatting mechanism, the data may be transmitted at that time, and/or the time may be used to listen for traffic.

Figure 2:
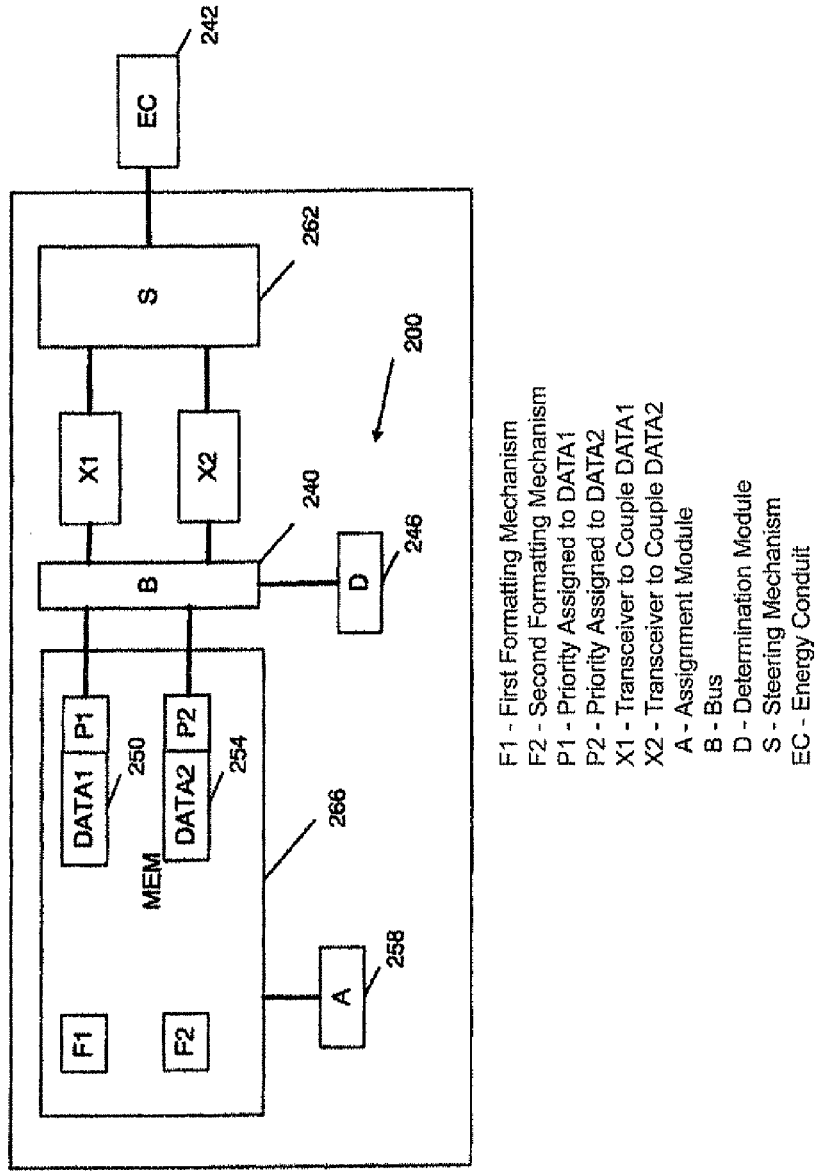
FIG. 2 is a block diagram of an apparatus and a system according to various embodiments.

FIG. 2 is a block diagram of an apparatus 200 and a system 210 according to various embodiments, each of which may operate in the manner described above. Thus, the apparatus 200 and the system 210 may be similar to or identical to the apparatus 100 and system 110 described previously (see FIG. 1).

For example, an apparatus 200 may comprise a determination module 246 to determine whether a first priority P1 assigned to first data 250 associated with a first formatting mechanism F1 is greater than a second priority P2 assigned to second data 254 associated with a second formatting mechanism F2. The first formatting mechanism F1 may be different than the second formatting mechanism F2.

The apparatus 200 may include an assignment module 258 to assign the first priority P1 to the first data 250, as well as to assign the second priority P2 to the second data 254. As noted previously, the first and second formatting mechanisms F1, F2 may be selected from one or more of a communications standard, a communications protocol, a spread-spectrum communications technique, a data format, and a data type, among others.

Each of the priorities P1, P2 may be indicated by or stored as a priority tag attached to the data 250, 254 according to an IEEE 802.1Q standard. The apparatus 200 may also include a steering mechanism 262 to direct either the first data 250 or the second data 254 so as to be communicated through space via an energy conduit 242. The steering mechanism 262 may include a hardware module (e.g., a physical switch) and/or a software module (e.g., one or more program branch instructions), or a combination of these, as desired. Other embodiments may be realized.

For example, a system 210 may include an apparatus 200, similar to or identical to the apparatus 100 described above (see FIG. 1), as well as an energy conduit 242 to communicate either the first data or the second data through space for reception by some other device (not shown). The system 210 may include a hardware bus 240 to share the first priority P1 and the second priority P2, as well as a memory 266 to store the first priority P1 and the second priority P2. The memory 266 may also be used to store the first data 250 and the second data 254. The system 210 may also include one or more receivers, transmitters, and/or transceivers X1, X2 to selectively couple the first data 250 and the second data 254 to the energy conduit 242, perhaps via the steering mechanism 262.

The apparatus 100, 200, systems 110, 210, modules 112, 258, NDIS drivers 114, 118, bus driver 122, entities 126-127, software environment 130, hardware environment 134, modules 135-138, buses 140, 240, energy conduits 142, 242, determination module 246, data 250, 254, formatting mechanisms F1, F2, priorities P1, P2, steering mechanism 262, and memory 266 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100, 200 and the systems 110, 210, and as appropriate for particular implementations of various embodiments.

It should also be understood that the apparatus and systems of various embodiments can be used in applications other than transmitters and receivers, and other than for wireless systems, and thus, various embodiments are not to be so limited. The illustrations of an apparatus 100, 200 and systems 110, 210 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Figure 3:
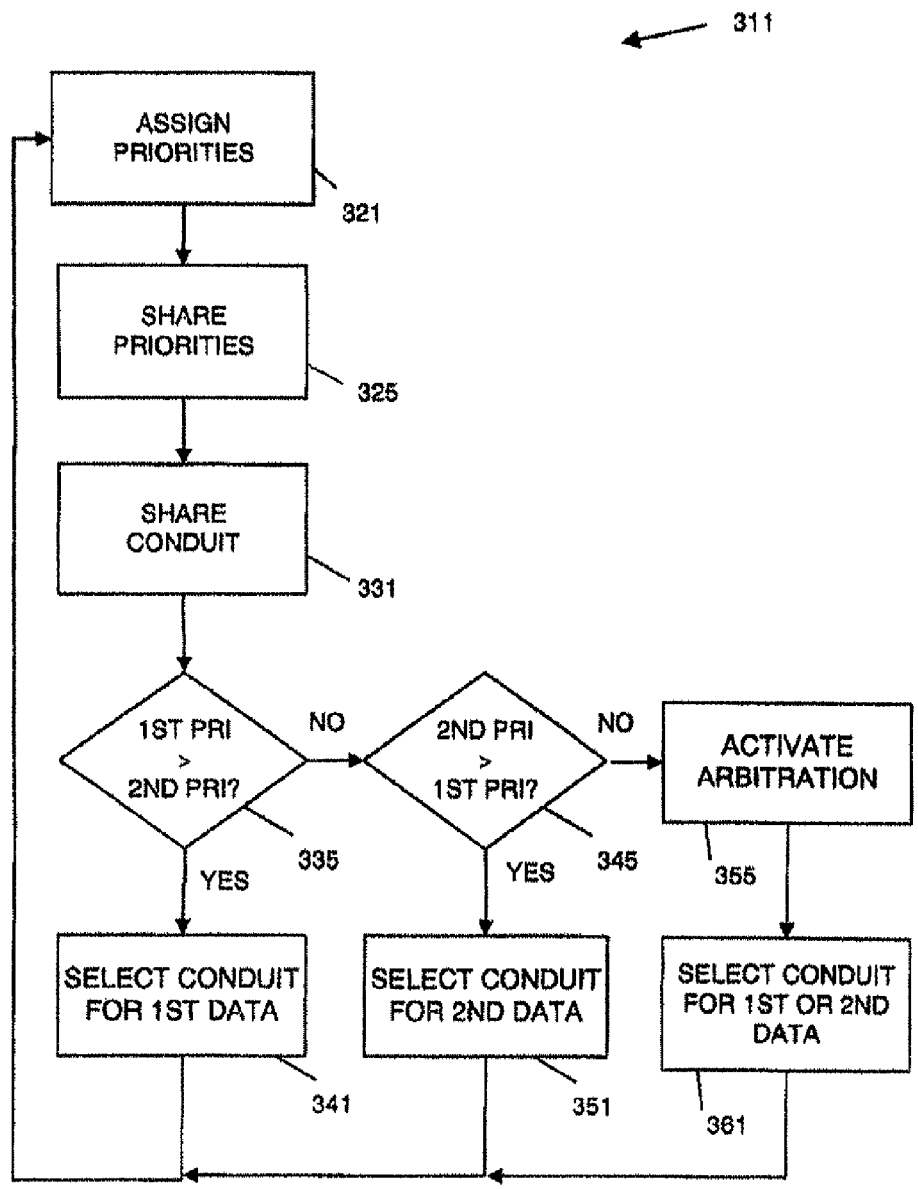
FIG. 3 is a flow chart illustrating several methods according to various embodiments.

FIG. 3 is a flow chart illustrating several methods according to various embodiments. In some embodiments of the invention, a method 311 may begin with assigning a first priority to first data associated with a first formatting mechanism, and assigning a second priority to second data associated with a second formatting mechanism at block 321. For example, priority may be indicated by a priority tag attached to the first and/or second data according to the IEEE 802.1Q standard. The method 311 may continue at block 325 with sharing the first priority and the second priority using a hardware bus, or a memory, for example, to enable determining the greatest priority by various hardware and/or software elements.

The method 311 may include sharing an energy conduit between the first data communicated according to the first formatting mechanism and second data communicated according to the second formatting mechanism at block 331. The energy conduit may be selected from a number of elements, and combinations of elements, including antennas, infra-red transmitters and/or receivers, photo-emitters and receptors, and charge-coupled devices, among others.

As noted above, the first formatting mechanism may be different from the second formatting mechanism, and either formatting mechanism may be selected from one or more of a communications standard, a communications protocol, a spread-spectrum communications technique, a data format, and a data type. For example, if the formatting mechanisms are selected from among communications standards, these may be selected to include an IEEE 802.11 standard and a Bluetooth System Specification. Sharing the conduit may be accomplished according to the first priority assigned to the first data and the second priority assigned to the second data.

For example, sharing the energy conduit at block 331 may further include determining which of the priorities is greatest. Thus, the method 311 may include determining whether the first priority is greater than the second priority at block 335. If so, the method 311 may include selecting the energy conduit to communicate the first data at block 341, and then (optionally) continue with assigning new priorities at block 321. The method 311 may also include determining whether the second priority is greater than the first priority at block 345. If so, the method 311 may include selecting the energy conduit to communicate the second data at block 351, and then (optionally) continue with assigning new priorities at block 321.

If it is determined that the first priority and the second priority are substantially equal (e.g., the first priority is not greater than the second priority, and the second priority is not greater than the first priority, as determined at blocks 335 and 345), then the method 311 may include activating an arbitration mechanism to determine whether the energy conduit will be selected for communicating the first data or the second data at block 355, and then selecting the conduit to communicate the appropriate data at block 361, as described above. The method 311 may (optionally) continue with assigning new priorities at block 321.

It should be noted that the methods described herein do not have to, be executed in the order described, or in any particular order. Moreover, various activities described with respect to the methods identified herein can be executed in serial or parallel fashion. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized, as shown in FIG. 4.

Figure 4:
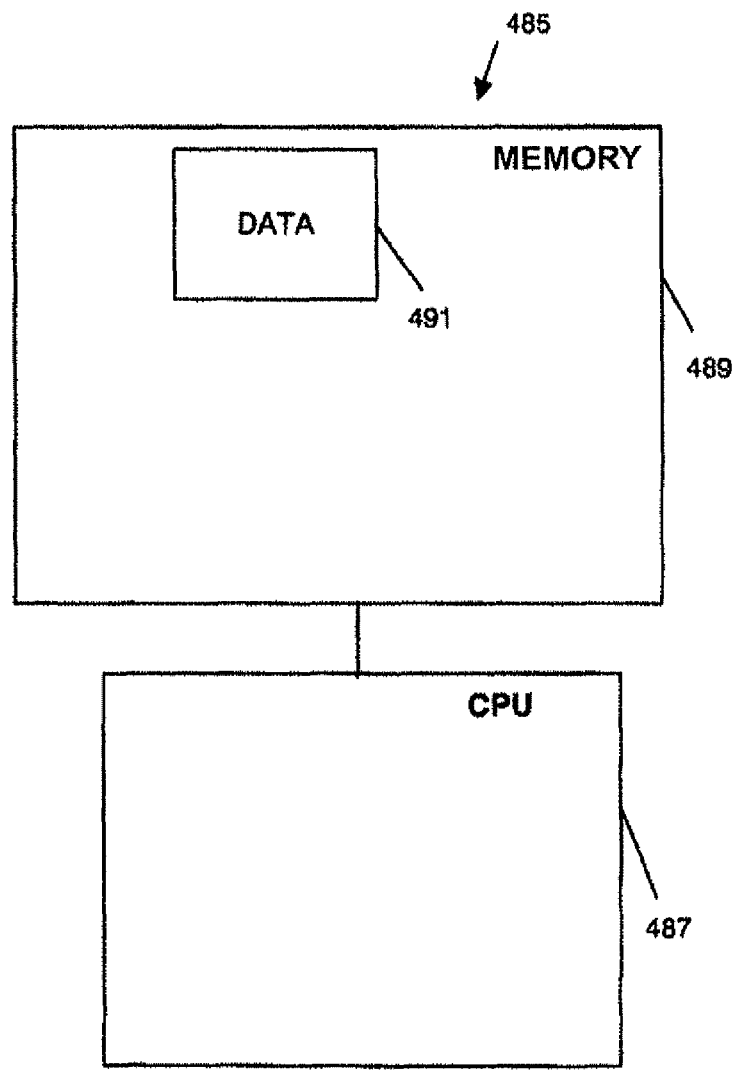
FIG. 4 is a block diagram of an article according to various embodiments.

FIG. 4 is a block diagram of an article 485 according to various embodiments, such as a computer, a memory system, a magnetic or optical disk, some other storage device, and/or any type of electronic device or system. The article 485 may comprise a processor 487 coupled to a machine-accessible medium such as a memory 489 (e.g., a memory including an electrical, optical, or electromagnetic conductor) having associated information 491 (e.g., computer program instructions, and/or other data), which when accessed, results in a machine (e.g., the processor 487) performing such actions as sharing an energy conduit between first data communicated according to a first formatting mechanism and second data communicated according to a second formatting mechanism. The first and second formatting mechanisms may be different. The energy conduit may be shared according to a first priority assigned to the first data and a second priority assigned to the second data.

In some embodiments, the energy conduit may be selected from one of an antenna, an infra-red transmitter, an infra-red receiver, a photo-emitter, a photo-receptor, and a charge-coupled device. Either of the formatting mechanisms may be selected from one of a communications standard, a communications protocol, a spread-spectrum communications technique, a data format, and a data type.

Other activities may include determining that either the first or second priority is greater than the second or first priority, respectively, and then selecting the energy conduit to communicate the appropriate data, as described above. Further activities may include determining that the first priority and the second priority are substantially equal, and activating an arbitration mechanism to determine whether the energy conduit will be selected to communicate the first data or the second data.

Implementing the apparatus, systems, and methods described herein may result in using IEEE 802.1Q priority tags to improve communications without changes in existing software. Multiple formatting mechanisms may thus be more readily managed while using a single energy conduit to communicate data.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for transmitting data packets, the method comprising:
formatting a first data ticket by a first formatting mechanism in accordance with a first communication protocol;
assigning a first priority to the first data packet formatted;
formatting a second data packet by a second formatting mechanism in accordance with a second communication protocol that is different from the first communication protocol;
assigning a second priority to the second data packet formatted;
attaching a priority tag to each of the first data packet and the second data packet, the priority tag including at least data priority level and management priority level that are shared and compared between the first formatting mechanism and the second formatting mechanism;
determining one of the first priority and the second priority as having a higher priority than the other; and
transmitting by a transmitter one of the first data packet and the second data packet having the higher priority over a single energy conduit prior to transmitting the other of the first data packet and the second data packet over the single energy conduit.

2. The method of claim 1, wherein the assigning the first priority to the first data packet and assigning the second priority to the second data packet comprises attaching a priority tag to each of the first data packet and the second data packet.

3. The method of claim 2, wherein the attaching the priority tag comprises attaching the priority tag including an IEEE 802.1Q priority tag.

4. The method of claim 1, further comprising:
formatting the first data packet in accordance with the first communication protocol that is an IEEE 802.11 protocol; and
formatting the second data packet in accordance with the second communication protocol that is a Bluetooth protocol.

5. The method of claim 1, wherein the transmitting over the single energy conduit comprises transmitting over the single energy conduit that is an antenna, an infrared transmitter, a photo emitter, or a charge coupled device.

6. The method of claim 1, further comprising:
determining that the first priority and the second priority are substantially equal;
activating an arbitration mechanism to select one of the first data packet and the second data packet when the first priority and the second priority are substantially equal; and
transmitting the selected one over the single energy conduit.

7. An apparatus comprising:
a first formatting mechanism configured to format a first data packet in accordance with a first communication protocol;
a second formatting mechanism configured to format a second data packet in accordance with a second communication protocol that is different from the first communication protocol;
an assignment module configured to assign a first priority to the first data packet formatted, assign a second priority to the second data packet formatted, and attach a priority tag to each of the first data packet and the second data packet, the priority tag including at least data priority level and management priority level that are shared and compared between the first formatting mechanism and the second formatting mechanism;
a determination module configured to determine one of the first priority and the second priority as having a higher priority than the other; and
a transmitter configured to transmit one of the first data packet and the second data packet having the higher priority over a single energy conduit prior to transmitting the other of the first data packet and the second data packet over the single energy conduit.

8. The apparatus of claim 7, wherein the first communication protocol is an IEEE 802.11 protocol and the second communication protocol is a Bluetooth protocol.

9. The apparatus of claim 7, further comprising a steering mechanism configured to steer the first data packet or the second data packet to the single energy conduit for transmission.

10. The apparatus of claim 9, wherein the steering mechanism comprises a switch.

11. The apparatus of claim 7, wherein the single energy conduit is an antenna, an infrared transmitter, a photo emitter, or a charge coupled device.

12. The apparatus of claim 7, wherein the apparatus comprises a television, a cellular phone, a personal computer, a personal digital assistant, a workstation, a radio, a video player, or a vehicle.

13. The apparatus of claim 7, wherein the determination module is further configured to determine that the first priority and the second priority are substantially equal and activate an arbitration mechanism to select one of the first data packet and the second data packet when the first priority and the second priority are substantially equal, and the transmitter is further configured to transmit the selected one over the single energy conduit.

14. A computer program, tangibly stored on a computer readable non-transitory medium, the computer program being executable by a processor and comprising instructions for:
formatting a first data packet by a first formatting mechanism in accordance with a first communication protocol;
assigning a first priority to the first data packet formatted;
formatting a second data packet by a second formatting mechanism in accordance with a second communication protocol that is different from the first communication protocol;
assigning a second priority to the second data packet formatted;
attaching a priority tag to each of the first data packet and the second data packet, the priority tag including at least data priority level and management priority level that are shared and compared between the first formatting mechanism and the second formatting mechanism; and
determining one of the first priority and the second priority as having a higher priority than the other, and transmitting one of the first data packet and the second data packet having the higher priority over a single energy conduit prior to transmitting the other of the first data packet and the second data packet over the single energy conduit.

15. The computer program of claim 14, wherein the instructions for assigning the first priority to the first data packet and the instructions for assigning the second priority to the second data packet comprise instructions for attaching a priority tag to each of the first data packet and the second data packet.

16. The computer program of claim 15, wherein the priority tag comprises an IEEE 802.1Q priority tag.

17. The computer program of claim 14, wherein the first communication protocol is an IEEE 802.11 protocol and the second communication protocol is a Bluetooth protocol.

18. The computer program of claim 14, wherein the single energy conduit is an antenna, an infrared transmitter, a photo emitter, or a charge coupled device.

19. The computer program of claim 14, further comprises instructions for:
 determining that the first priority and the second priority are substantially equal;
 activating an arbitration mechanism to select one of the first data packet and the second data packet when the first priority and the second priority are substantially equal; and
 transmitting the selected one over the single energy conduit.

* * * * *